United States Patent [19]

Enomoto

[11] 4,323,303
[45] Apr. 6, 1982

[54] AUTOMATIC FOCUSING CAMERA

[75] Inventor: Shigeo Enomoto, Tokyo, Japan

[73] Assignee: Asahi Kogaku Kogyo Kabushiki Kaisha, Tokyo, Japan

[21] Appl. No.: 115,327

[22] Filed: Jan. 25, 1980

[30] Foreign Application Priority Data

Feb. 28, 1979 [JP] Japan .................................. 54-23024

[51] Int. Cl.³ .............................................. G03B 3/10
[52] U.S. Cl. ...................................... 354/25; 354/197; 354/286; 352/140
[58] Field of Search ................ 354/25, 195, 197, 286, 354/288; 352/142, 140; 350/41, 44, 47; 355/56

[56] References Cited

U.S. PATENT DOCUMENTS 3,940,777  2/1976  Komine .............................. 352/140
4,178,087  12/1979  Shenk .............................. 354/195

*Primary Examiner*—L. T. Hix
*Assistant Examiner*—Stafford D. Schreyer

*Attorney, Agent, or Firm*—Sughrue, Mion, Zinn, Macpeak and Seas

[57] ABSTRACT

An automatic focusing camera and interchangeable lens in which the camera body is provided with an automatic focusing control circuit, and an electric motor, also provided in the camera body and which operates in response to the output of the circuit, produces rotary motion which is transmitted to a lens through a mounting device for driving the lens to a point of correct focalization. For the smallest of three types of interchangeable lenses, the motor in the camera body is used directly to drive the lens. For a second larger type of interchangeable lens, a separate electric motor is provided with the lens itself. The separate motor is provided with control signals through contacts provided on the camera body and lens mount which are coupled to the control circuit in the camera body. In a third type of lens, the second electric motor and its battery are provided in an separate casing which is detachably mounted to the casing of the lens.

5 Claims, 7 Drawing Figures

AUTOMATIC FOCUSING CAMERA

BACKGROUND OF THE INVENTION

A number of different focus point detectors have been proposed in the art. Although they are different in the focus point detecting method employed, in most of these focus point detectors, the output signal becomes a maximum when the focus point is detected.

The present invention relates to an automatic focusing camera utilizing such a focus point detector. The invention can be effectively applied to single-lens still cameras, movie cameras and television cameras utilizing interchangeable lenses. That is, according to the invention, various interchangeable lenses having different focal lengths can be used as automatic focusing interchangeable lenses with an interchangeable lens type camera without lowering the lens interchangeability which is essential so that it is not necessary to supply a new camera body with each lens.

An automatic focusing camera in which the driving of the focus control member of the interchangeable lens is governed by a focusing electric motor provided on the camera body has been disclosed by Japanese Patent Application No. 1927/1979 filed by the present applicant which is mentioned here not as prior art but merely as a related device to aid in the understanding of the present invention. In an automatic focusing camera of this type, automatic focalization is achieved by providing a drive transmitting mechanism for the focus control member on the interchangeable lens. With this camera, it is unnecessary to provide an electric motor and a battery in the interchangeable lens. Thus, the automatic focusing camera is simple in construction and low in manufacturing cost. Accordingly, even if a variety of interchangeable lenses are modified so as to be used with the camera, only slight economical burden is put on the user and, accordingly, the user may use any of the interchangeable lenses thus modified. However, since the motor and battery are furnished in the camera body, its output and capacity are necessarily limited. Furthermore, in the case where large interchangeable lenses such as telephoto or super-telephoto interchangeable lenses are modified to automatic focusing interchangeable lenses, the load on the motor increases excessively which may present difficulties in that the service lives of the relevant elements are reduced, the focusing speed may be unsatisfactory, and so forth.

Accordingly, an object of this invention is to eliminate all of the above-described difficulties. According to the invention, all of the photographing lenses can be sufficiently modified to photographing lenses for an automatic focusing camera which are satisfactory from a practical standpoint.

SUMMARY OF THE INVENTION

This, as well as other objects of the invention, are met by an automatic focusing camera in which a focus control member of a first type of interchangeable lens is driven by a first focusing electric motor provided on the camera body including a circuit for controlling rotation of the motor to move a lens along an optical axis thereof to a focus point with the circuit provided inside a camera body, a camera body having signal contacts provided on a lens mounting mechanism thereof with the signal contacts being coupled to receive an output signal of the circuit, and a second type of interchangeable lens including a focus control member, a second focusing electric motor of which the rotation and stopping are controlled in accordance with the signal received through the signal contacts, and means for supplying current to the second focusing electric motor wherein the focus control member of the second type of interchangeable lens is driven by the second electric motor for focalization.

Also, this and other objects of the invention are met by an automatic focusing camera in which a focus control member of a first type of interchangeable lens is driven by a first focusing electric motor provided on the camera body of the camera including a circuit mounted within the camera body for controlling rotation of the motor to move a lens along an optical axis thereof to a focus point, a camera body having signal contacts provided on a lens mounting mechanism thereof with the signal contacts coupled to receive an output signal of the circuit, a focusing drive device including, constructed as a single unit, a second focusing electric motor and means for supplying current to the second focusing electric motor, the focusing drive device being detachably mounted on the second type of interchangeable lens through a mounting device, and a second type of interchangeable lens having a focus control member adapted to be driven by the second focusing electric motor. The second focusing electric motor is adapted to be coupled to the contacts through the second type of interchangeable lens wherein the second focusing motor is controlled by the signal received on the signal contacts so that the focus control member of the second type of interchangeable lens is driven for focalization.

Moreover, this and other objects of the invention are met by an interchangeable lens including a photographic lens, namely the glass lens component, a lens case member which surrounds the photographic lens, mounting means on the lens case member which is adapted to mate with a corresponding mounting means on a camera body, contact means adapted to mate with corresponding contact means on the camera body, means for receiving a battery, and a focusing electric motor electrically coupled to receive operating power from the contact means and which is mechanically coupled to move the photographic lens along an optical axis thereof with the motor receiving operating power from the battery. The battery receiving means and the motor are disposed adjacent the photographing lens wherein the battery receiving means and the motor are detached from the camera body along with the lens case member. The battery receiving means and the focusing electric motor are provided integrally with the lens case member. In another preferred embodiment, the battery receiving means and the focusing electric motor are provided in a casing which is detachably mounted to the lens case.

DESCRIPTION OF THE PREFERRED EMBODIMENTS

Figure 1:
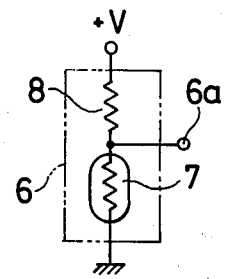
FIG. 1 is a circuit diagram showing an example of a simple focus point detector.
Figure 2:
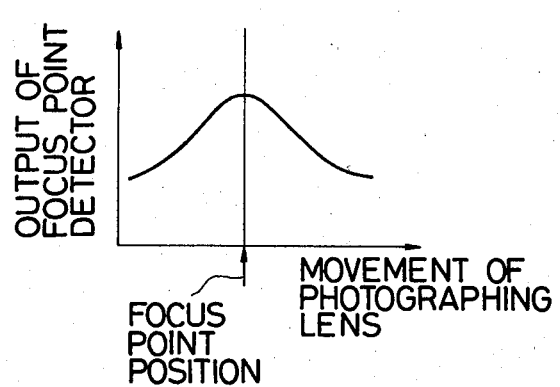
FIG. 2 is a graphical representation indicating variations of the output of the focus point detector shown in FIG. 1 with movement of the photographing lens.

The invention will be described with reference to the accompanying drawings. FIG. 1 shows an example of a simple focus point detector. The focus point detector 6 is composed of a CdS cell 7 and a resistor 8. FIG. 2 is a graphical representation indicating variations in the output voltage provided at the terminal 6a of the circuit shown in FIG. 1 with the movement of the lens. When an optical image on the CdS cell 7 is clearest, the resistance of the CdS cell 7 is highest and, accordingly, the output voltage is at its maximum. This position corresponds to the focus point position of the lens.

Figure 3:
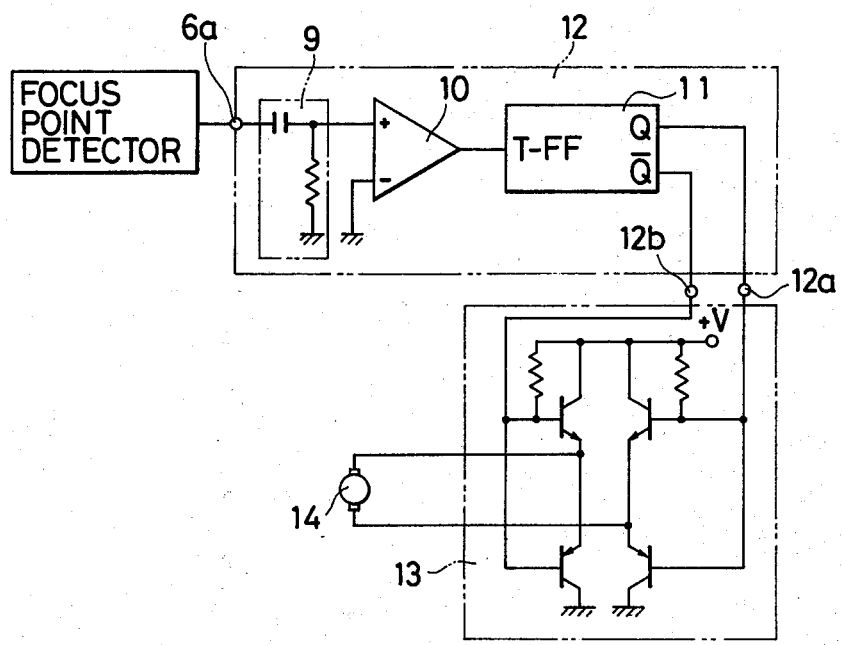
FIG. 3 is a circuit diagram partly as a block diagram, showing an example of a control circuit for an automatic focusing camera using the focus point detector shown in FIG. 1.

FIG. 3 shows an example of a control circuit for an automatic focusing camera which utilizes a focus point detector as shown in FIG. 1. In the control circuit, an output provided at the terminal 6a of a focus point detector is applied to a direction sensing circuit 12 which includes a differentiation circuit 9, a comparator 10 and a T flip-flop 11. The output of the direction sensing circuit 12 is amplified by a power amplifier circuit 13 which drives a focusing electric motor 14 which moves the focus control member of the photographing lens.

The operation of the circuit shown in FIG. 3 will be now described. When the motor 14 rotates and moves the photographing lens, then the output of the focus point detector 6 varies as indicated in FIG. 2. If the output is increasing, the differentiation circuit 9 outputs a positive voltage which indicates that the photographing lens is approaching the focus point position and, accordingly, the comparator 10 outputs a high level signal. When the output of the detector 6 decreases, it can be determined that the photographing lens is moving away from the focus point position. In this case, the output of the differentiation circuit 9 is a negative voltage and the output of the comparator 10 assumes a low level. Simultaneously, the states of the outputs Q and $\overline{Q}$ of the T flip-flop 11 change and the changed outputs are applied to the power amplifier circuit 13 as a result of which the motor 14 rotates in the opposite direction. Thus, it can be understood that, with the aid of the circuit shown in FIG. 3, the photographing lens is moved to the focus point position where it is maintained after being slightly moved back and forth until the precise focus point position is reached. In the control circuit shown in FIG. 3, the direction of rotation of the motor 14 is determined by the states of the outputs Q and $\overline{Q}$ of the flip-flop 11 in the direction indicating circuit 12. A stop signal is provided to cause the states of the outputs Q and $\overline{Q}$ to repeatedly change in a short period of time.

Figure 4:
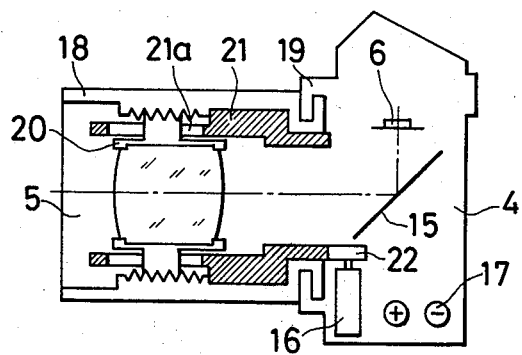
FIG. 4 is an explanatory diagram showing an example of an automatic focusing camera in which the focus

FIG. 4 shows a preferred embodiment of an automatic focusing camera according to the invention in which the focus control member of an interchangeable lens is driven by a focusing electric motor provided on the camera body. In FIG. 4, reference numeral 4 designates a single-lens reflex camera body; 15, a mirror; and 6, a focus point detector, the photoelectric surface of which is spaced a distance from the mirror 15 which corresponds to the distance between the surface of a film and the mirror 15; 16, a focusing motor; 17, a battery adapted to supply current to the focusing motor 16 and the control circuit shown in FIG. 3; and 5, an automatic focusing interchangeable lens.

Figure 5:
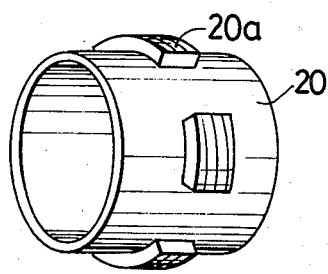
FIG. 5 is a perspective view of the photographing lens shown in FIG. 4.

The interchangeable lens 5 is constructed as follows. An outer cylinder 18 is mounted on the camera body 4 through a lens mounting mechanism 19. Multi-threads are formed in the inner wall of the outer cylinder 18 to fixedly secure a photographing lens frame 20. This photographing lens frame 20 and a rotary cylinder 21 form the focus control member. The photographing lens frame 20 has multi-threaded portions 20a as shown in FIG. 5 which engage with the outer cylinder 18 and with linear grooves 21a formed in the rotary cylinder 21. Therefore, as the rotary cylinder 21 is rotated, the photographing lens frame 20 moves in the direction of the optical axis. When the interchangeable lens 5 is mounted on the camera body 4, one end face of the rotary cylinder 21 abuts against a roller 22 mounted on the output shaft of the focusing motor 16. Accordingly, as the focusing motor 16 rotates as directed by the control circuit shown in FIG. 3, the rotary cylinder 21 rotates driven by the roller 22 and the photographing lens frame 20 moves to the focus point position.

With the automatic focusing camera shown in FIG. 4 constructed as described above, the interchangeable lens is simple in construction. Since the focusing motor, the battery, the detector and the control circuit are provided in the camera body, the automatic focusing camera can be used with a variety of interchangeable lenses having different focal lengths. In other words, various interchangeable lenses can be selectively mounted on a single automatic focusing camera body. Thus, the automatic focusing camera of the invention is economical. Furthermore, if the focusing motor 16 and its roller are suitably positioned so that they do not obstruct the operation of an ordinary manual focusing lens, a conventional manual focusing lens can as well be mounted on the camera body. However, as was described before, there are certain limitations for an automatic focusing camera of this type on the use of a variety of interchangeable lenses because the focusing motor and the battery are positioned in the camera body.

Figure 6:
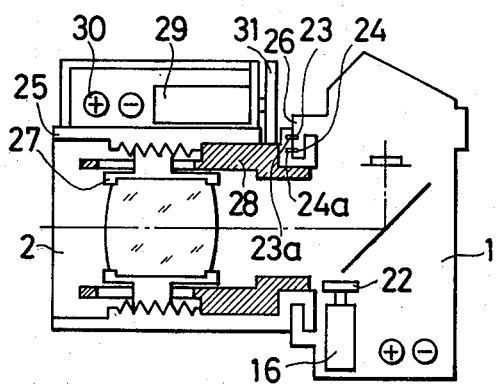
FIG. 6 is an explanatory diagram showing an example of an automatic focusing camera according to the invention.

Another embodiment of the automatic focusing lens and camera according to the invention as shown in FIG. 6 includes a single-lens reflex camera body which is somewhat different from the single lens reflex camera body shown in FIG. 4 in that signal contacts 23 and 24 are provided for its interchangeable lens mounting mechanism 26. The outputs 12a and 12b of the direction indicating circuit 12 in the control circuit shown in FIG. 3 are coupled to the signal contacts 23 and 24. The construction of the automatic focusing interchangeable lens 2 shown in FIG. 6 is as follows. An outer cylinder 25 is mounted on the single-lens reflex camera body 1 through its interchangeable lens mounting mechanism 26. In this operation, signal contacts 23a and 24a provided on the lens side are brought into contact with the contacts 23 and 24 on the body side.

In FIG. 6, reference numerals 27 and 28 designate a photographing lens frame and a rotary cylinder, respectively, which are the same in construction as the frame 20 and rotary cylinder 21 described with reference to FIGS. 4 and 5. Accordingly, as the rotary cylinder 28 rotates, the photographing lens frame 27 is moved along the optical axis. However, in this case, unlike the case of FIG. 4, the rotary cylinder 28 is not brought into contact with the roller mounted on the output shaft of the focusing motor. That is, the interchangeable lens, as shown in FIG. 6, is provided with a focusing electric motor 29 fixedly secured to the outer cylinder 25 and a battery 30 for powering the motor 29. A roller 31 is mounted on the output shaft of the motor 29. The roller 31 extends through a slot formed in the outer cylinder 25 abutting against the rotary cylinder 28. The automatic focusing camera shown in FIG. 6 is constructed as described above.

A circuit (not shown) equivalent to the power amplifier circuit 13 in the control circuit in FIG. 3 is furnished in the interchangeable lens 2 in FIG. 6. A signal from the direction indicating circuit in the camera body 1 is received through the signal contacts 23 and 24 which contacts the rotation of the focusing motor 29 as a result of which the rotary cylinder 28 is rotated by the roller 31 thereby moving the photographing lens frame 27 to the focus point position.

As is clear from the above description, for the embodiment of the automatic focusing camera according to the invention shown in FIG. 6, each interchangeable lens is provided with its own focusing motor, battery and power amplifier circuit. Accordingly, especially in the case of large size automatic focusing lenses, the motor, battery and other circuit components can be selected as desired so that they have a torque, power and capacity most suitable for the automatic focusing lenses, respectively. Accordingly, any large telephoto lens can be modified into an automatic focusing lens according to the invention.

Furthermore, an automatic focusing interchangeable lens as shown in FIG. 4 can be also mounted on the automatic focusing camera according to the invention. Accordingly, an automatic focusing interchangeable lens having a short focal length can be driven by the focusing motor furnished in the camera body while a large interchangeable lens can be driven by a focusing motor and battery provided with the interchangeable lens itself. Thus, the number of types of automatic focusing lenses usable with the automatic focusing camera is increased and many interchangeable lenses of different focal lengths can be used with the automatic focusing camera similarly to an ordinary single-lens reflex camera.

Figure 7:
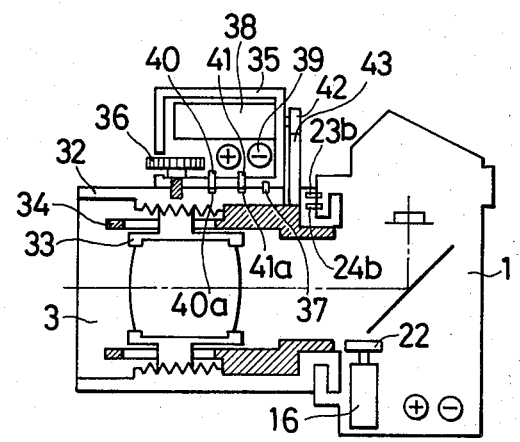
FIG. 7 is also an explanatory diagram showing another example of an automatic focusing camera according to the invention.

Shown in FIG. 7 is further embodiment of the automatic focusing camera according to the invention. In FIG. 7, reference numeral 1 designates a single-lens reflex camera body which is the same in construction to that shown in FIG. 6. Reference numeral 3 designates an automatic focusing interchangeable lens. The construction of the interchangeable lens 3 is as follows. An outer cylinder 32 is mounted on the camera body 1 through an interchangeable lens mounting mechanism 26 whereupon signal contacts 23b and 24b provided on the lens are brought into contact with signal contacts 23 and 24, respectively, provided on the camera body. The interchangeable lens further includes a photographing lens frame 33 and a rotary cylinder 34. As in the automatic focusing camera shown in FIG. 4, as the rotary cylinder 34 is rotated, the photographing lens frame 33 moves along the optical axis. Furthermore, similarly to the automatic focusing camera shown in FIG. 6, the end face directed toward the camera body of the rotary cylinder is not brought into contact with the roller mounted on the output shaft of the focusing motor furnished in the camera body.

In FIG. 7, reference numeral 35 designates a focusing drive device which has mounting means including a mounting screw 36 and a positioning pin 37 by which the focusing drive device is secured to the interchangeable lens' outer cylinder 32. Provided in the focusing drive device 36 are a focusing electric motor 38 and a battery 39. When the focusing drive device 35 is mounted on the interchangeable lens 3, electrical contacts 40 and 41 provided on the focusing drive device are brought into contact with signal contacts 40a and 41a provided on the interchangeable lens while a roller 42 mounted on the output shaft of the focusing motor 38 abuts against the rotary cylinder 34 through a roller 43 mounted on a shaft.

Furthermore, a circuit similar to the power amplifier circuit 13 in the control circuit in FIG. 3 is provided in the focusing drive device 35 in FIG. 7. The output signal of the direction indicating circuit 12 in the camera body 1 is applied to the power amplifier circuit through the signal contacts 23 and 24 between the camera body and the interchangeable lens and the signal contacts 40 and 41 between the focusing drive device and the interchangeable lens to thereby control the rotation of the focusing motor 38. The rotation of the focusing motor 38 is transmitted through the rollers 42 and 43 to the rotary cylinder 34 so that the photographing lens frame 33 is moved along the optical axis to the focus point position.

Thus, the automatic focusing camera shown in FIG. 7, the focusing drive device 35 is detachably mounted on the interchangeable lens while the focusing drive device 35 incorporates the focusing motor, the battery and the power amplifier circuit. Accordingly, the focusing drive device can be used commonly with different automatic focusing interchangeable lenses. Furthermore, the automatic focusing interchangeable lens is very simple in construction as described above. Thus, a very economical automatic focusing camera is realized according to this embodiment of the invention. Since the body of the automatic focusing camera shown in FIG. 7 is the same in construction as the automatic focusing camera shown in FIG. 6, an interchangeable lens used with the automatic focusing camera shown in FIG. 6 can be also used with the automatic focusing camera shown in FIG. 7.

Thus, a small interchangeable lens having a short focal length can be driven by the focusing motor furnished in the camera body, a large interchangeable lens having a long length can be driven by the focusing motor and its battery which are furnished on the lens itself because of its large size and heavy weight while medium interchangeable lens can be driven by the automatic focusing drive device which can be used with a number of middle interchangeable lenses. Thus, all types of automatic focusing interchangeable lenses of different focal lengths can be used with the automatic focusing camera without putting a heavy economical burden on the operator.

What is claimed is:

1. In an automatic focusing still camera in which a focus control member of a first type of interchangeable lens is driven by a first focusing electric motor provided on a camera body of said still camera, the improvements comprising:

a circuit for controlling rotation of said motor to move a lens of said first type along an optical axis thereof to a focus point;

said camera body having first signal contacts provided on a lens mounting mechanism thereof, said first signal contacts being coupled to receive an output signal of said circuit; and a second type of interchangeable lens comprising a focus control member, a second focusing electric motor, and second signal contacts the rotation and stopping of said second focusing motor being controlled in accordance with said signal received through said second signal contacts from said first signal contacts, and means for supplying current to said second focusing electric motor, wherein said focus control member of said second type of interchangeable lens is driven by said second electric motor for focalization.

2. In an automatic focusing still camera in which a focus control member of a first type of interchangeable lens is driven by a first focusing electric motor provided on the still camera body of said camera, the improvement comprising:

a circuit for controlling rotation of said motor to move a lens of said first type along an optical axis thereof to a focus point;

said camera body having first signal contacts provided on a lens mounting mechanism thereof, said first signal contacts being coupled to receive an output signal of said circuit;

a focusing drive device including, constructed as a single unit, a second focusing electric motor and means for supplying current to said second focusing electric motor, said focusing drive device having second signal contacts being detachably mounted on second type interchangeable lens through a mounting device; and a second type of interchangeable lens having a focus control member adapted to be driven by said second focusing electric motor when said focusing drive device is mounted thereon, said second focusing electric motor being adapted to be coupled by said second signal contacts to said first contacts through cooperating contacts on said second type of interchangeable lens engagable with said first signal contacts, wherein said second focusing motor is controlled by said signal received on said signal contacts wherein said focus control member of said second type of interchangeable lens is driven for focalization.

3. An interchangeable lens comprising:
a photographing lens;
a lens case member;
mounting means being coupled to said lens case member and being adapted to mate with a corresponding mounting means on a still camera body;
contact means on said lens case adapted to mate with corresponding contact means on a still camera body;
means external to said still camera body for receiving a battery, and a battery disposed therein; and
a focusing electric motor electrically coupled to receive control power through said contact means and being mechanically coupled to move said photographing lens along an optical axis thereof, said motor receiving operating power from said battery, and said battery receiving means and said motor being disposed adjacent said photographing lens wherein said battery receiving means and said motor are detached from a still camera body along with said lens case member.

4. The interchangeable lens of claim 3 wherein said battery receiving means and said focusing electric motor are provided integrally with said lens case member.

5. The interchangeable lens of claim 3 wherein said battery receiving means and said focusing electric motor are provided in a casing detachably mounted to said lens case.

* * * * *